United States Patent
Itabashi et al.

(10) Patent No.: US 9,688,541 B2
(45) Date of Patent: Jun. 27, 2017

(54) BETA ZEOLITE AND METHOD FOR PRODUCING SAME

(71) Applicants: UniZeo Co., Ltd., Tokyo (JP); THE UNIVERSITY OF TOKYO, Tokyo (JP)

(72) Inventors: Keiji Itabashi, Tokyo (JP); Tatsuya Okubo, Tokyo (JP); Kenta Iyoki, Tokyo (JP)

(73) Assignees: UniZeo Co., Ltd., Tokyo (JP); THE UNIVERSITY OF TOKYO, Tokyo (JP)

( * ) Notice: Subject to any disclaimer, the term of this patent is extended or adjusted under 35 U.S.C. 154(b) by 448 days.

(21) Appl. No.: 14/391,547

(22) PCT Filed: Apr. 9, 2013

(86) PCT No.: PCT/JP2013/060684
§ 371 (c)(1),
(2) Date: Oct. 9, 2014

(87) PCT Pub. No.: WO2013/154086
PCT Pub. Date: Oct. 17, 2013

(65) Prior Publication Data
US 2015/0086786 A1 Mar. 26, 2015

(30) Foreign Application Priority Data

Apr. 10, 2012 (JP) .................................. 2012-089029
Mar. 11, 2013 (JP) .................................. 2013-048074

(51) Int. Cl.
*C01B 39/06* (2006.01)
*C01B 39/46* (2006.01)
(Continued)

(52) U.S. Cl.
CPC ............... *C01B 39/46* (2013.01); *B01J 20/18* (2013.01); *B01J 20/28057* (2013.01);
(Continued)

(58) Field of Classification Search
CPC ........ C01B 39/06; C01B 39/46; B01J 29/041; B01J 29/048; B01J 29/7007;
(Continued)

(56) References Cited

U.S. PATENT DOCUMENTS

2011/0286914 A1 11/2011 Li et al.
2015/0086786 A1* 3/2015 Itabashi .................. C01B 39/46
428/402

FOREIGN PATENT DOCUMENTS

CN 1872685 A 12/2006
CN 101205072 A 6/2008
(Continued)

OTHER PUBLICATIONS

Jiang et al, "Extra large pore zeolites: bridging the cap between micro and mesoporous structures", Angwe. Chem. Int. Ed. (2010) pp. 3120-3145.*
(Continued)

*Primary Examiner* — David M Brunsman
(74) *Attorney, Agent, or Firm* — Locke Lord LLP

(57) ABSTRACT

The present invention provides a beta zeolite that is useful as a catalyst, adsorbent agent, or the like, and that is both microporous and mesoporous. The beta zeolite is characterized by (i) the $SiO_2/Al_2O_3$ ratio being 8-30, and the $SiO_2/ZnO$ ratio being 8-1000, (ii) the micropore surface area being 300-800 $m^2/g$, (iii) the micropore volume being 0.1-0.3 $cm^3/g$, and (iv) having mesopores having, in the state as synthesized, a diameter of 2-6 nm and a volume of 0.001-0.3 $cm^3/g$. The beta zeolite is favorably produced by means of adding and reacting a zinc silicate beta zeolite as a seed
(Continued)

EXAMPLE 1 crystal with a reaction mixture containing a silica source, an alumina source, an alkali source, and water.

5 Claims, 4 Drawing Sheets

(51) Int. Cl.

| | |
|---|---|
| *B01J 29/04* | (2006.01) |
| *B01J 29/70* | (2006.01) |
| *B01J 39/04* | (2017.01) |
| *B01J 35/00* | (2006.01) |
| *B01J 35/10* | (2006.01) |
| *B01J 20/18* | (2006.01) |
| *B01J 20/28* | (2006.01) |

(52) U.S. Cl.
CPC ... *B01J 20/28071* (2013.01); *B01J 20/28083* (2013.01); *B01J 29/7007* (2013.01); *B01J 35/002* (2013.01); *B01J 35/1019* (2013.01); *B01J 35/1023* (2013.01); *B01J 35/1038* (2013.01); *B01J 35/1061* (2013.01); *B01J 39/04* (2013.01); *C01B 39/06* (2013.01); *B01D 2253/1085* (2013.01); *B01D 2253/306* (2013.01); *B01D 2253/31* (2013.01); *B01D 2255/502* (2013.01); *B01D 2255/9202* (2013.01); *B01D 2258/012* (2013.01); *B01D 2258/014* (2013.01); *C01P 2006/12* (2013.01); *C01P 2006/16* (2013.01); *Y10T 428/2982* (2015.01)

(58) Field of Classification Search
CPC ............... B01J 29/7057; B01J 35/1019; B01J 35/1061; B01J 35/1057; B01J 35/1038; B01J 35/1023
See application file for complete search history.

(56) References Cited

FOREIGN PATENT DOCUMENTS

| EP | 1 892 040 A1 | 2/2008 |
|---|---|---|
| EP | 2 457 872 A1 | 5/2012 |
| JP | 2002-519281 A | 7/2002 |
| JP | 2010-537938 A | 12/2010 |
| JP | 2011-126768 A | 6/2011 |
| WO | 2010/145077 A1 | 12/2010 |
| WO | 2011/013560 A1 | 2/2011 |

OTHER PUBLICATIONS

Kamimura et al, "Synthesis of Zeolite Having High Industrial Value Without Using Organic Structure-Directing Agent" Catalyst, vol. 53, No. 7 (Dec. 10, 2011) pp. 386-391.*

Takewaki et al., "Zincosilicate CIT-6: A Precursor to a Family of *BEA-Type Molecular Sieves", J. Phys. Chem. B., 1999, vol. 103, No. 14, pp. 2674-2679.

Takewaki et al., "Synthesis of CIT-6, a zincosilicate with the *BEA topology", Topics in Catalysis 9 (1999), pp. 35-42.

Serrano et al., "Mechanism of CIT-6 and VPI-8 Crystallization from Zincosilicate Gels", Chem. Eur. J. 2002, 8, No. 22, pp. 5153-5160.

Extended European Search Report dated Apr. 2, 2015, issued in corresponding Patent Application No. 13775736.5 (7 pages).

Office Action dated Jul. 27, 2015, issued in counterpart Chinese Patent Application No. 201380018964.2 (6 pages).

International Search Report dated Jul. 9, 2013 issued in corresponding application No. PCT/JP2013/060684.

\* cited by examiner

SEED CRYSTAL

EXAMPLE 1

EXAMPLE 2

EXAMPLE 10

EXAMPLE 10

US 9,688,541 B2

BETA ZEOLITE AND METHOD FOR PRODUCING SAME

This application is a 371 filing of PCT/JP2013/060684, filed Apr. 9, 2013.

TECHNICAL FIELD

The present invention relates to a beta zeolite and a method for producing the same.

BACKGROUND ART

A synthetic zeolite is crystalline aluminosilicate, and has uniform pores that are attributed to a crystal structure thereof and has an angstrom size. Taking advantage of such a feature, the synthetic zeolite is industrially used as a molecular sieving adsorbent that adsorbs only a molecule having a specific size, an adsorption separating agent that adsorbs a molecule having strong affinity, or a catalytic base. A beta zeolite that is one of such zeolites is currently used in quantity as a catalyst in the petrochemical industry or an adsorbent for vehicle exhaust gas treatment throughout the world.

A method of synthesizing the beta zeolite is variously proposed. A typical method is a method of using a surfactant of a tetraethylammonium ion and the like, as an organic structure defining agent (hereinafter abbreviated to "OSDA"). However, a compound containing the tetraethylammonium ion is expensive, and what is more, most of the compound is decomposed after beta zeolite crystallization is terminated. As such, it is impossible to recover and reuse the compound. For this reason, the beta zeolite produced by such a method is expensive. Further, since the tetraethylammonium ion is incorporated into a crystal of the beta zeolite, it is necessary to fire the beta zeolite to remove the tetraethylammonium ion when the beta zeolite is used as the adsorbent or the catalyst. In that case, exhaust gases are responsible for environmental pollution, and further, many chemicals are required for detoxification treatment of a synthetic mother liquid. In this way, the method of synthesizing the beta zeolite using the tetraethylammonium ion is not only an expensive method but also a production method having a great environmental load. As such, there is a need to realize a production method of using no OSDA.

Therefore, the applicant has proposed a production method of producing a beta zeolite using no OSDA (see Patent Document 1). According to this method, there is an advantage that self-reproduction of the beta zeolite is infinitely possible without using the OSDA.

Incidentally, as a porous crystal having a pore of a mesopore region, a mesoporous molecular sieve including MCM-41 is known. Since the OSDA is still used for synthesis of the mesoporous molecular sieve, the aforementioned disadvantage is present.

Patent Document 1: Japanese Unexamined Patent Application, Publication No. 2011-126768

DISCLOSURE OF THE INVENTION

Problems to be Solved by the Invention

The invention is intended to provide a beta zeolite whose performance is more improved than the conventional beta zeolite described above, and a method for producing the same.

Means for Solving the Problems

The present invention is to provide a beta zeolite in which
(i) a $SiO_2/Al_2O_3$ ratio ranges from 8 to 30, and a $SiO_2/ZnO$ ratio ranges from 8 to 1000,
(ii) a micropore surface area ranges from 300 to 800 $m^2/g$,
(iii) a micropore volume ranges from 0.1 to 0.3 $cm^3/g$; and
(iv) in an as-synthesized state, a diameter of a mesopore ranges from 2 to 6 nm, and a volume of the mesopore ranges from 0.001 to 0.3 $cm^3/g$.

Further, the present invention is to provide a suitable production method for the beta zeolite, which includes
(1) mixing a silica source, an alumina source, an alkali source, and water so as to be a reaction mixture having a composition represented by a molar ratio given below;

$SiO_2/Al_2O_3$=8 to 300

$Na_2O/SiO_2$=0.05 to 0.6

$H_2O/SiO_2$=5 to 50

(2) using the beta zeolite, which has a $SiO_2/ZnO$ ratio ranging from 4 to 50, a $SiO_2/Al_2O_3$ ratio that is equal to or more than 4, and a mean particle size that is equal to or more than 100 nm, as a seed crystal without being fired, and adding the beta zeolite to the reaction mixture at a rate of 0.1 to 20% by weight with respect to a silica component in the reaction mixture; and
(3) airtightly heating the reaction mixture to which the seed crystal is added at 80 to 200° C.

Effects of the Invention

The beta zeolite of the present invention has both a micropore and a mesopore, and is useful as a catalyst, an absorbent, ion exchange material, and various functional materials.

PREFERRED MODE FOR CARRYING OUT THE INVENTION

Figure 1:
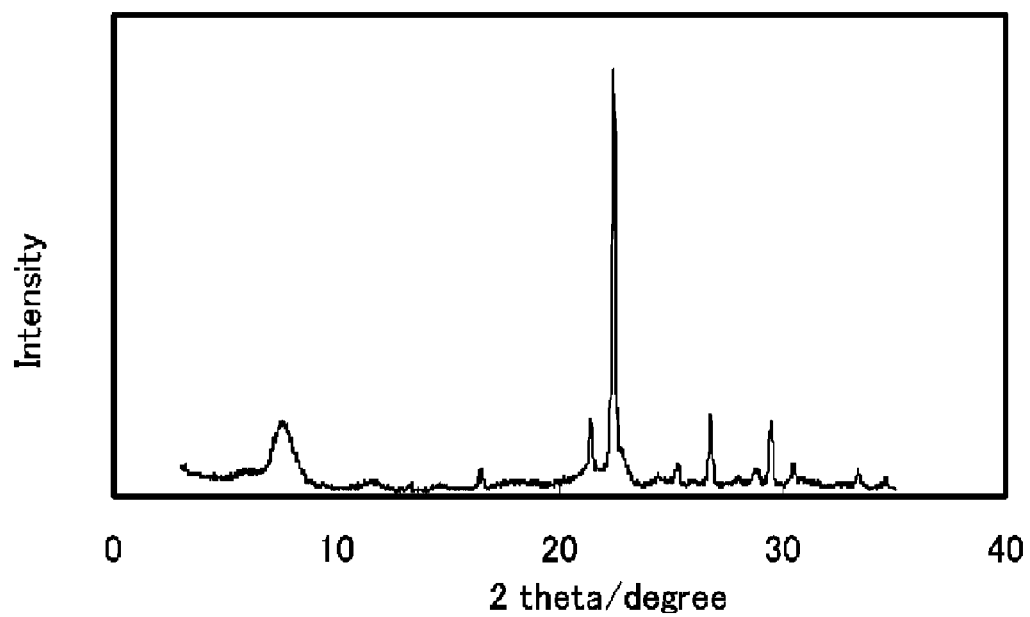
FIG. 1 is an X-ray diffraction diagram of an unfired zinc silicate beta zeolite used in Example 1.

A beta zeolite of the present invention has a feature in that it has both a micropore and a mesopore. A hitherto known beta zeolite has the micropore, but a beta zeolite having the mesopore in addition to the micropore is not known up to now. Furthermore, the beta zeolite of the present invention has an aluminosilicate skeleton, and a structure in which a part of aluminum in the aluminosilicate skeleton is substituted with zinc. In this way, the beta zeolite of the present invention is a very novel material that is not known up to now. The micropore refers to a pore whose diameter is less than 2 nm, and the mesopore refers to a pore whose diameter is not less than 2 nm and not more than 50 nm.

As for the zinc contained in the beta zeolite of the present invention, when expressed in terms of a $SiO_2/ZnO$ ratio, a content thereof ranges from 8 to 1000, preferably from 10 to 500, and more preferably from 10 to 350. By setting the content of the zinc within such a range, the structure having both the micropore and the mesopore can be easily realized while maintaining the skeleton of the beta zeolite.

On the other hand, as for the aluminum, when expressed in terms of a $SiO_2/Al_2O_3$ ratio, a content thereof ranges from 8 to 30, preferably from 10 to 25, and more preferably from 10 to 22. By setting the content of the aluminum within such a range, the skeleton of the beta zeolite can be easily maintained.

Amounts of the zinc and aluminum contained in the beta zeolite of the present invention can be controlled by adjusting a gel composition, a content of zinc in the seed crystal, and a ratio of addition of the gel and the seed crystal in the production method to be described below.

The beta zeolite of the present invention has both the micropore and the mesopore, which is as described previously. As for the micropore of these pores, a volume thereof has a high value that ranges from 0.1 to 0.3 $cm^3/g$, preferably from 0.11 to 0.3 cm/g, and more preferably from 0.12 to 0.3 $cm^3/g$. Further, a surface area of the micropore has a high value that ranges from 300 to 800 $m^2/g$, preferably from 300 to 750 $m^2/g$, and more preferably from 330 to 700 $m^2/g$.

On the other hand, as for the mesopore, a diameter thereof in the as-synthesized state ranges from 2 to 6 nm, preferably from 2 to 5 nm, and more preferably from 3 to 5 nm. A volume of the mesopore in the as-synthesized state ranges from 0.001 to 0.3 $cm^3/g$, preferably from 0.003 to 0.2 $cm^3/g$, and more preferably from 0.005 to 0.1 $cm^3/g$.

The beta zeolite of the present invention that has the micropore and the mesopore with the size as mentioned above and contains the zinc is useful as, for instance, a purification catalyst for exhaust gases of an internal combustion engine such as an gasoline engine or a diesel engine, a synthetic catalyst of a petrochemical product, a selective synthetic catalyst of a structural isomer, an adsorbent in a $N_2/O_2$ adsorption separating process, an ion exchange material, and various functional materials.

While the description above has been made of the micropore and the mesopore in the beta zeolite of the present invention, a BET specific surface area of the beta zeolite of the present invention preferably ranges from 400 to 800 $m^2/g$, and more preferably from 500 to 800 $m^2/g$.

The beta zeolite of the present invention includes a sodium type and an alkali metal ion or a divalent metal ion other than sodium, and further includes one that becomes an $H^+$ type by ion exchange of a sodium ion with a proton. When the beta zeolite is the $H^+$ type, the aforementioned physical properties are measured after the proton is substituted with the sodium ion. In converting the beta zeolite from the sodium type to the $H^+$ type, for example, the sodium type beta zeolite is dispersed in an aqueous solution of an ammonium salt such as ammonium nitrate, and the sodium ion in the zeolite is substituted with an ammonium ion. The ammonium type beta zeolite is fired, and thereby the $H^+$ type beta zeolite is obtained.

The aforementioned specific surface area and volume are measured using a surface area measuring device based on nitrogen adsorption as described in the following examples.

Next, a preferred production method of the beta zeolite of the present invention will be described. In the present production method, the seed crystal of the beta zeolite is used, and is grown in a gel having a specified composition, thereby obtaining the beta zeolite having an intended structure.

As the seed crystal, a zinc silicate beta zeolite is used. A feature of the present production method is the use of this special seed crystal. With the use of this seed crystal, the beta zeolite combining the intended micropore and mesopore can be successfully produced. In contrast, even by the use of the typical aluminosilicate beta zeolite, the beta zeolite having an intended structure cannot be obtained.

The zinc silicate beta zeolite has a structure in which aluminum in the aluminosilicate beta zeolite is substituted with zinc in whole or in part. A zinc silicate beta zeolite is a known material in the art, and a production method thereof is described in, for instance, Documents 1 to 3 below. In these documents, for instance, the zinc silicate beta zeolite is synthesized using tetraethylammonium hydroxide as the OSDA.

Document 1: J. Phys. Chem., B 1999, 103, 2674-2679
Document 2: Topics in Catalysis 9 (1999), 35-42
Document 3: Chem. Eur. J. 2002, 8, No. 22, 5153-5160

In the zinc silicate beta zeolite used as the seed crystal in the present production method, a $SiO_2/ZnO$ ratio ranges from 4 to 50, preferably from 5 to 40, and more preferably from 8 to 30. On the other hand, a $SiO_2/Al_2O_3$ ratio is 4 or more, preferably 10 or more, more preferably 13 or more, and still more preferably 20 or more. The $SiO_2/Al_2O_3$ ratio has no upper limit. That is, no aluminum may be contained in the seed crystal. Further, the zinc silicate beta zeolite in which both aluminum and zinc are contained may be used as the seed crystal.

A mean particle size of the seed crystal is set to 100 nm or more, preferably 100 to 2000 nm, and more preferably 200 to 1000 nm. Sizes of crystals of the zeolites obtained by synthesis are not generally uniform, and have a certain degree of particle size distribution. It is not difficult to obtain a crystal particle size having a greatest frequency among them. The mean particle size indicates a particle diameter of the crystal of the greatest frequency in the observation based on a scanning electron microscope. A mean particle size of the beta zeolite composed of the zinc silicate obtained by the methods described in Documents 1 to 3 generally has a range from 100 nm to 1000 nm. However, small particles are aggregated, and thus the particle size of the beta zeolite is unclear, or the particle size exceeding 1000 nm is also present. Further, a special device is required to synthesize particles less than 100 nm, which makes the beta zeolite expensive. Accordingly, in the present invention, the beta zeolite having the mean particle size of 100 nm or more is used as the seed crystal. The beta zeolite obtained by the present production method has the mean particle size of such a range, and thus can be adequately used as the seed crystal.

The reaction mixture to which the seed crystal is added is obtained by mixing a silica source, an alumina source, an alkali source, and water so as to have a composition represented by a molar ratio given below. A reaction mixture having such a composition is used, and the seed crystal of the zinc silicate beta zeolite is used, and thereby the beta zeolite having the micropore and the mesopore intended originally can be obtained.

SiO$_2$/Al$_2$O$_3$=8 to 300

Na$_2$O/SiO$_2$=0.05 to 0.6

H$_2$O/SiO$_2$=5 to 50

A more preferable range of the composition of the reaction mixture is as follows.

SiO$_2$/Al$_2$O$_3$=20 to 300

Na$_2$O/SiO$_2$=0.1 to 0.5

H$_2$O/SiO$_2$=10 to 30

A silica source used to obtain the reaction mixture having the molar ratio may include a silicon-containing compound that can create a silicate ion among silica, the others, and water. To be specific, the silica source may include wet process silica, dry process silica, colloidal silica, sodium silicate, and an aluminosilicate gel. These silica sources may be used independently or by combining two types or more. Among these silica sources, it is preferable to use the silica (silicon dioxide) in that the beta zeolite can be obtained without an unnecessary by-product.

As the alumina source, for instance, a compound containing aqueous aluminum may be used. To be specific, the alumina source may include sodium aluminate, aluminum nitrate, aluminum sulfate, and so on. Further, aluminum hydroxide is also one of the alumina sources. These alumina sources may be used independently or by combining two types or more. Among these alumina sources, it is preferable to use the sodium aluminate or the aluminum hydroxide in that the beta zeolite can be obtained without an unnecessary by-product (for instance, sulfate or nitrate).

As the alkali source, for instance, sodium hydroxide may be used. When the sodium silicate is used as the silica source or when the sodium aluminate is used as the alumina source, the sodium that is an alkali metal component contained therein is simultaneously considered as NaOH, and is also an alkaline component. Thus, Na$_2$O described above is calculated as the sum of all the alkaline components in the reaction mixture.

For an addition sequence of the raw materials when the reaction mixture is prepared, a method of easily obtaining a uniform reaction mixture may be employed. For example, the alumina source is added to and dissolved in a sodium hydroxide aqueous solution under room temperature, and then the silica source is added and mixed by agitation. Thereby, the uniform reaction mixture can be obtained. The seed crystal is generally added while being mixed with the silica source or after the silica source is added, but is not particularly limited to a time to add. Afterwards, the seed crystal is agitated and mixed to be uniformly dispersed. A temperature when the reaction mixture is prepared is also not particularly limited as well, and the reaction mixture may generally be prepared at room temperature (20 to 25° C.)

The reaction mixture containing the seed crystal is put into, heated and reacted in an airtight container, and crystallizes a beta zeolite under autogenous pressure. No OSDA is included in the reaction mixture. It is important for the seed crystal to use one obtained by the methods described in Documents 1 to 3 mentioned above with no change. That is, the seed crystal is not fired. Accordingly, the OSDA used in synthesizing the seed crystal remains in the pore of the seed crystal. Even when the beta zeolite composed of the fired zinc silicate is used as the seed crystal, the beta zeolite having the intended micropore and mesopore cannot be obtained.

An amount of the seed crystal added to the reaction mixture is set to a ratio of 0.1 to 20% by weight to the silica component in the reaction mixture, preferably 0.5 to 15% by weight, and more preferably 1 to 10% by weight. The ratio between the seed crystal and the reaction mixture is set to such a range, and thereby the beta zeolite having the intended micropore and mesopore can be successfully produced.

When crystallized using the reaction mixture containing the seed crystal, the beta zeolite is aged and then heated, which is preferable because the crystallization is readily advanced. The aging refers to a process of holding the reaction mixture at a lower temperature than a reaction temperature for a given time. In the aging, the reaction mixture generally stands still without being agitated. It is known that, by performing the aging, effects of preventing impurities from being secondarily produced, making heating possible under agitation without the secondary production of the impurities, and raising a reaction rate are exerted, but an action mechanism is not always clear. A temperature and time for the aging are set such that such effects are exerted to the utmost extent. In the present production method, the aging is preferably performed at 20 to 100° C., more preferably 20 to 80° C., and still more preferably 20 to 60° C. in a range from 2 hours to one day.

When the reaction mixture is agitated to make its temperature uniform, the reaction mixture is agitated in an airtightly heating process after the aging is performed, and then the secondary production of the impurities can be prevented. The agitation can be performed by mixture caused by agitating blades or rotation of a container. Agitation strength and the number of rotations may be adjusted depending on temperature uniformity or a secondary production condition of the impurities. Intermittent agitation rather than normal agitation will do. In this way, the aging and the agitation are combined, and thereby industrial mass production is made possible.

Regardless of the case of performing the crystallization in a still standing state and the case of performing the crystallization in an agitated state, a heating temperature is in a range of 80 to 200° C., preferably 100 to 200° C., and more preferably 120 to 180° C. This heating is done under autogenous pressure. Since the crystallization rate becomes extremely slow at a temperature less than 80° C., creating efficiency of the beta zeolite becomes bad. On the other hand, since an autoclave having high pressure capacity is required at a temperature exceeding 200° C., economical efficiency is reduced, and a generation rate of the impurities becomes fast. The heating time is not critical in the present production method, and the heating may be performed until the beta zeolite having sufficiently high crystallinity is created. Generally, the beta zeolite having satisfactory crystallinity is obtained by heating of about 5 to 150 hours.

A crystal of the beta zeolite is obtained by such heating. After heating completion, powder of the created crystal is separated from a mother liquid by filtering, and then is cleaned with water or warm water and is dried. Since an amount of the organic substance substantially contained in the as-dried condition is small, even when the beta zeolite is not fired, the beta zeolite can be used as an adsorbent by dehydration. However, to sufficiently exert characteristics of the crystal of the obtained beta zeolite, the firing treatment is preferably performed. The firing can be easily performed by a method of, for instance, heating the crystal in the air at a temperature of 500° C. or more. Further, when the crystal is used as a solid acid catalyst, for instance, a Na$^+$ ion in the crystal is exchanged for a NH$_4^+$ ion, and then the crystal is fired, and thereby the crystal can be used as an H$^+$ type.

EXAMPLES

Hereinafter, the present invention will be described in greater detail by examples. However, the scope of the present invention is not limited to such examples. Unless mentioned otherwise, "%" refers to "% by weight."
Analyzers used in the examples, comparative examples, and reference examples below are as follows.

Powder X-ray diffraction device: MO3XHF$^{22}$ (radiation of CuK α-ray, voltage of 40 kV, current of 30 mA, scan step of 0.02°, and scan speed of 2°/min) made by Mac Science Co. Ltd.

Composition analysis device: ICP-AES LIBERTY Series II made by Varian Co. Ltd.

Scanning electron microscope: Field emission scanning electron microscope S-4800 made by Hitachi High-Technologies Co. Ltd. BET surface area measuring device: AUTOSORB-1 made by Quantachrome Instruments Co. Ltd.

Example 1

(1) Synthesis of Seed Crystal

Tetraethylammonium hydroxide (TEAOH) was used as an OSDA. Further, zinc diacetate dihydrate was used as a zinc source, and pulverized silica (Cab-O-Sil, M-5) was used as a silica source. Furthermore, lithium hydroxide and sodium hydroxide were used. Among these raw materials, the TEAOH, the lithium hydroxide, and the sodium hydroxide were dissolved in water, and then the zinc diacetate dihydrate was added. Subsequently, the pulverized silica was added and agitated for two hours. A composition of the reaction mixture obtained in this way was 0.05 M lithium hydroxide, 0.65M TEAOH, 0.03 M zinc diacetate dihydrate, 1 M pulverized silica, and 30M water. The reaction mixture was put into an autoclave formed of stainless steel having a lining of polytetrafluoroethylene, and was heated in a stationary state at 150° C. for 96 hours. A zinc silicate beta zeolite, in which due to the heating, a SiO$_2$/ZnO ratio was 13.1, and a SiO$_2$/Al$_2$O$_3$ ratio was infinite, was synthesized. An X-ray diffraction diagram of the unfired beta zeolite is shown in FIG. 1. The beta zeolite was observed by a scanning electron microscope, and a mean particle size thereof was 640 nm. A crystal of the beta zeolite was used as a seed crystal in an unfired state.

(2) Synthesis of Beta Zeolite

Figure 2:
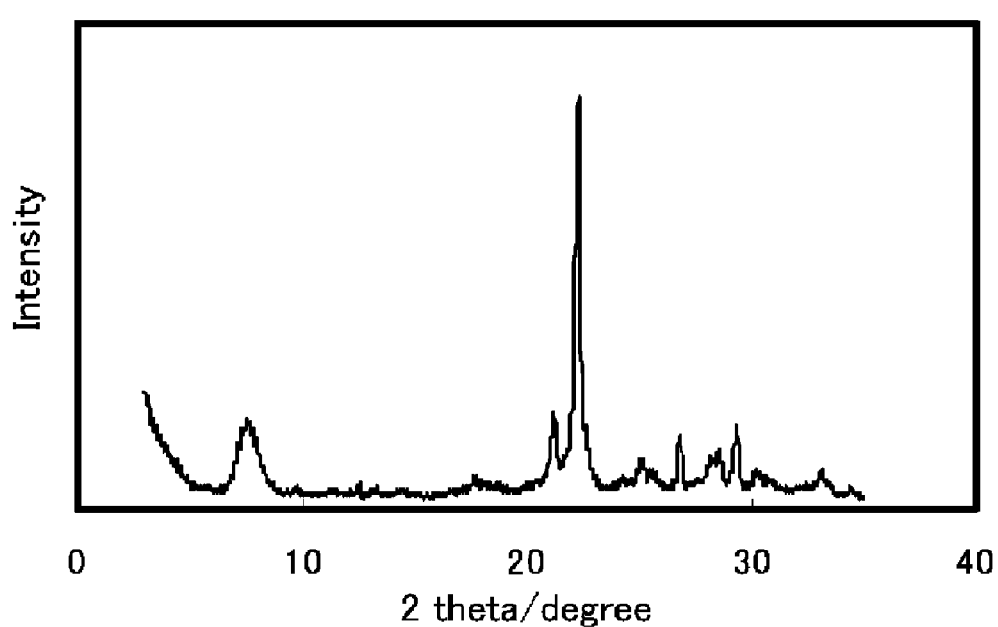
FIG. 2 is an X-ray diffraction diagram of the beta zeolite obtained by Example 1.
Figure 3:
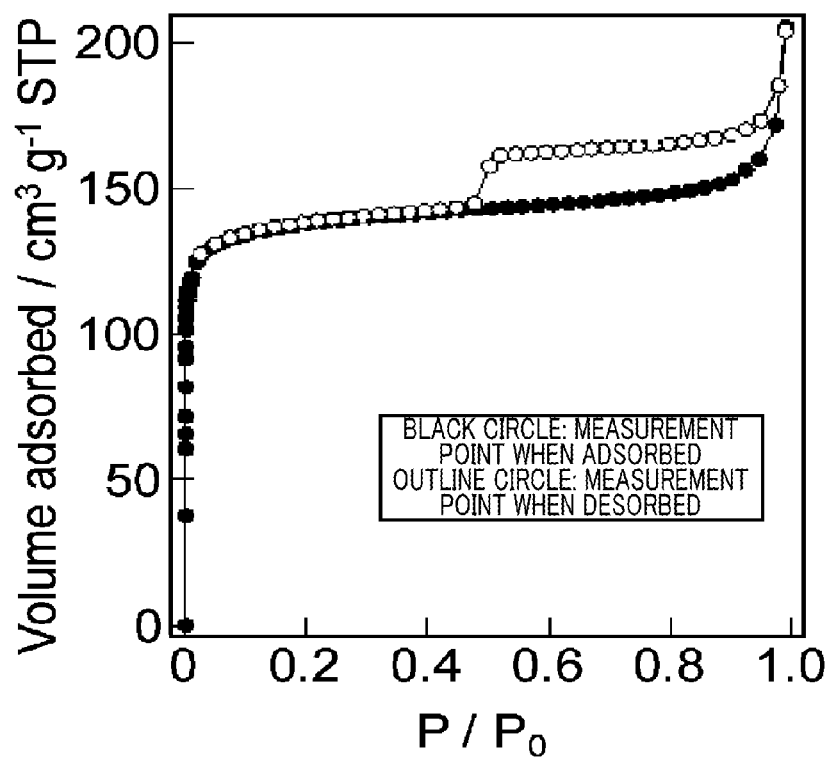
FIG. 3 is a nitrogen adsorption isotherm for the beta zeolite obtained by Example 1 at a liquid nitrogen temperature.

Sodium aluminate of 0.036 g and 36%, sodium hydroxide aqueous solution of 1.284 g were dissolved in pure water of 4.759 g, obtaining an aqueous solution. 0.937 g of pulverized silica (Cab-O-Sil, M-5) and 0.094 g of seed crystal were mixed, and the mixture was added to the aqueous solution bit by bit, agitated and mixed. A composition of a gel after the mixture was as shown Table 1. Further, an amount of addition of the seed crystal was 10%, with respect to a silica component in the gel. A mixture of the gel and the seed crystal was put into a 23 cc airtight container formed of stainless steel, and was heated under autogenous pressure at 140° C. for two days in a still standing state without aging and agitating. After the airtight container was cooled, a product was filtered, and cleaned with water, obtaining white powder. A result of X-ray diffraction of the product was shown that the product was confirmed that it was an impurity-free beta zeolite. An X-ray diffraction diagram of an unfired product is shown FIG. 2. Further, it was confirmed from a nitrogen adsorption isotherm (FIG. 3) at a liquid nitrogen temperature that the product had both a micropore and a mesopore having a feature as shown in Table 1. Numerical values representing pore characteristics are shown in Table 1.

Examples 2 to 10

Figure 4:
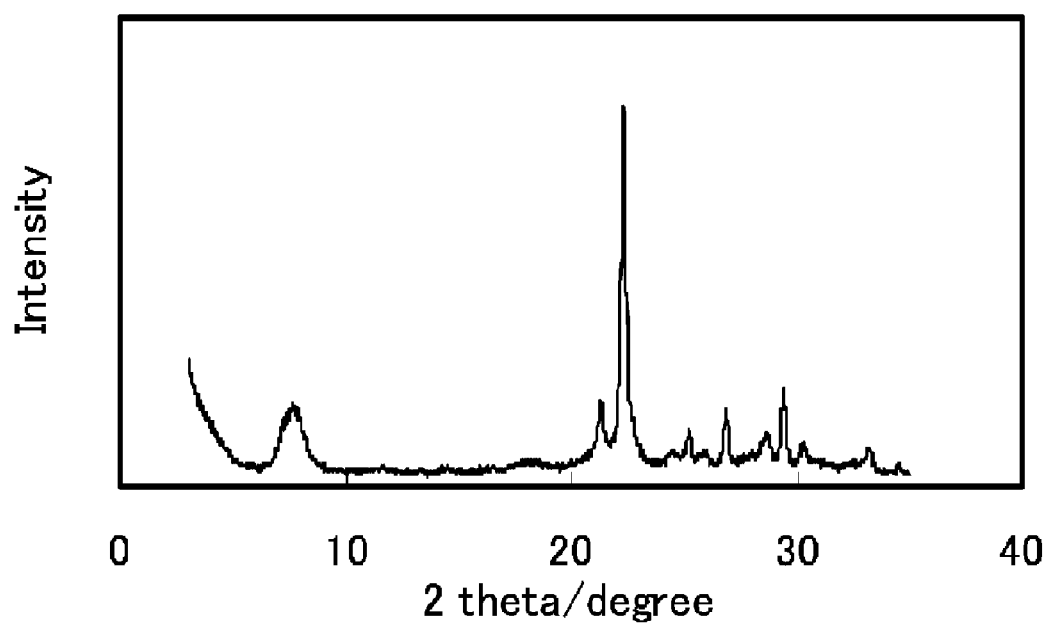
FIG. 4 is an X-ray diffraction diagram of a beta zeolite obtained by Example 2.
Figure 5:
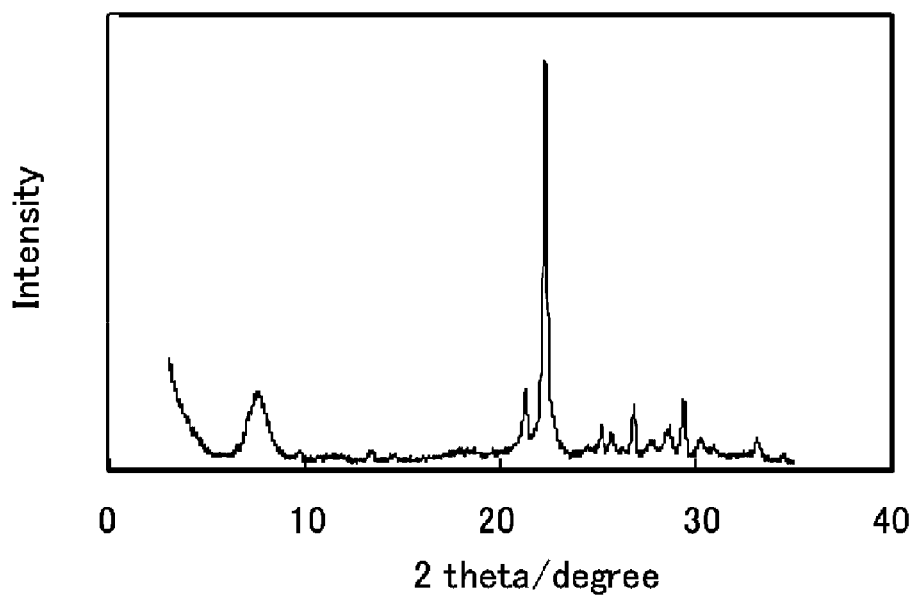
FIG. 5 is an X-ray diffraction diagram of a beta zeolite obtained by Example 8.
Figure 6:
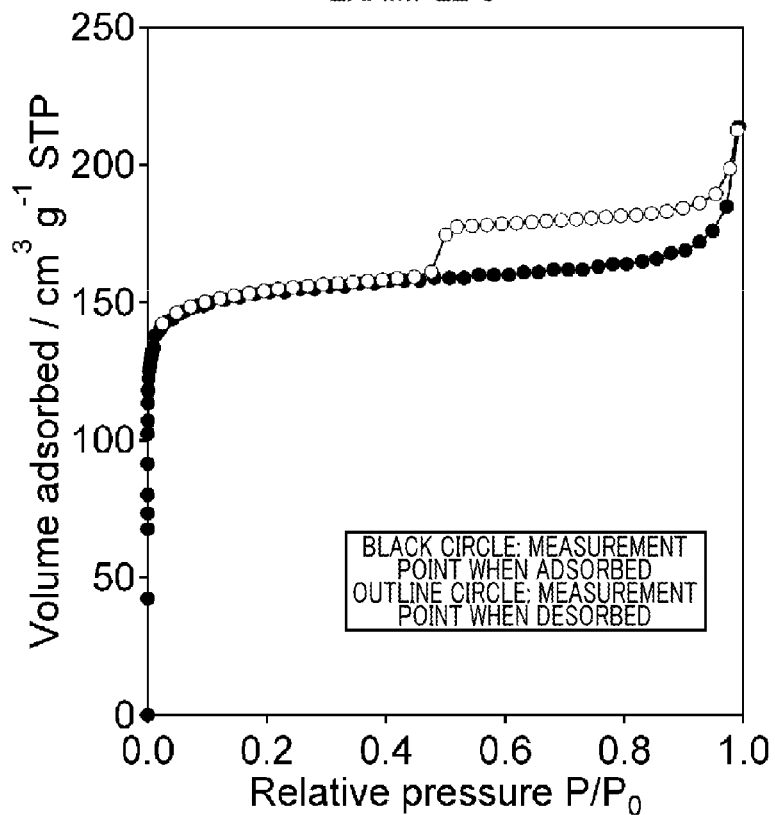
FIG. 6 is a nitrogen adsorption isotherm for the beta zeolite obtained by Example 8 at a liquid nitrogen temperature.
Figure 7:
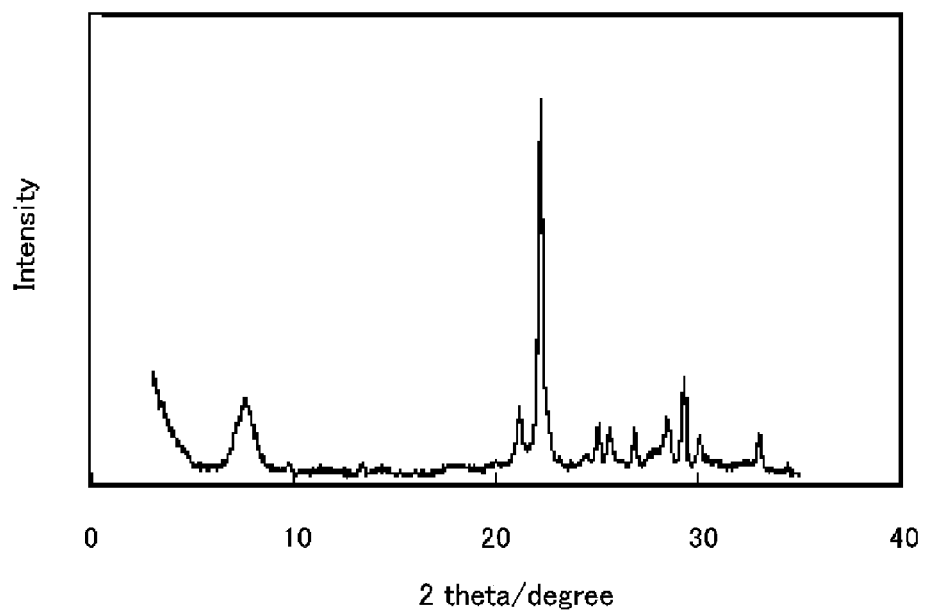
FIG. 7 is an X-ray diffraction diagram of a beta zeolite obtained by Example 10.
Figure 8:
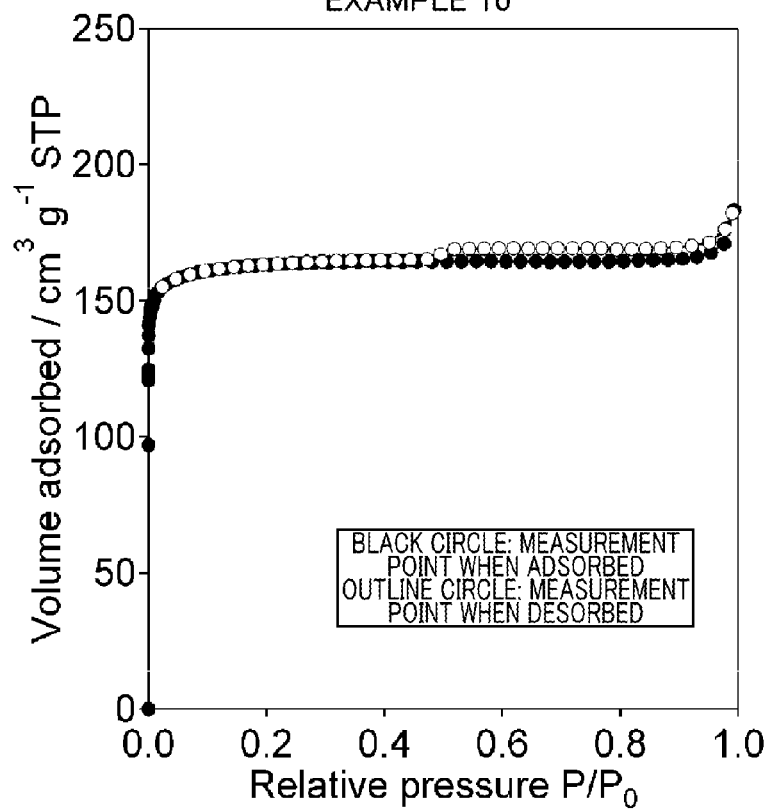
FIG. 8 is a nitrogen adsorption isotherm for the beta zeolite obtained by Example 10 at a liquid nitrogen temperature.

Examples 2 to 10 were made identical to Example 1 except employing the conditions shown in Table 1, obtaining a beta zeolite. The same evaluation as in Example 1 was performed on the obtained beta zeolite. The results thereof are shown in Table 1. Further, an X-ray diffraction diagram of the unfired beta zeolite obtained by Example 2 is shown in FIG. 4. Further, an X-ray diffraction diagram and a nitrogen adsorption isotherm of the unfired beta zeolite obtained by Example 8 are shown in FIGS. 5 and 6, respectively. An X-ray diffraction diagram and a nitrogen adsorption isotherm of the unfired beta zeolite obtained by Example 10 are shown in FIGS. 7 and 8, respectively.

Comparative Example 1

As a seed crystal, a fired product of an aluminosilicate beta zeolite synthesized using TEAOH as an OSDA was used. The beta zeolite had a SiO$_2$/Al$_2$O$_3$ ratio of 24.0, and did not contain ZnO. The seed crystal was added to a reaction mixture (gel) prepared using the same raw material as used in Example 1. A composition of the gel is as shown in Table 2. The gel containing the seed crystal was heated on the conditions shown in Table 2, and crystallization of the beta zeolite was performed. The obtained product was filtered and cleaned with water, obtaining white powder. A result of X-ray diffraction of the product was shown that it was confirmed that the product was an impurity-free beta zeolite. However, it was confirmed from a nitrogen adsorption isotherm at a liquid nitrogen temperature that no mesopore was present at all.

Comparative Examples 2 and 3

As a seed crystal, the fired product of the aluminosilicate beta zeolite used in Comparative Example 1 was used. The seed crystal was added to the reaction mixture (gel) having the composition shown in Table 2, and was heated on the conditions shown in Table 2, and crystallization of the beta zeolite was performed. The obtained product was filtered and cleaned with water, obtaining white powder. A result of X-ray diffraction of the product was shown that it was confirmed that the product was an impurity-free beta zeolite. However, it was confirmed from a nitrogen adsorption isotherm at a liquid nitrogen temperature that no mesopore was present at all.

Comparative Example 4

As a seed crystal, the fired product (in the air at 550° C. for ten hours) of the unfired zinc silicate beta zeolite used in Example 2 was used. A reaction was performed with the same composition and conditions as Example 2 except this. The obtained product was filtered and cleaned with water, obtaining white powder. A result of X-ray diffraction of the product was shown that the product was amorphous.

TABLE 1

| Example | Composition of reaction mixture SiO₂/Al₂O₃ | Na₂O/SiO₂ | H₂O/SiO₂ | Seed crystal Amount of addition (wt %) | Heating conditions Temperature (°C.) | Time (h) | Zeolite | Product SiO₂/Al₂O₃ | SiO₂/ZnO | Micropore surface area (m²/g) | Micropore volume (cm³/g) | Mesopore diameter (nm) | Mesopore volume (cm³/g) |
|---|---|---|---|---|---|---|---|---|---|---|---|---|---|
| 1 | 120 | 0.35 | 20 | 10 | 140 | 48 | *BEA Zeolite | 11.6 | 106 | 503 | 0.20 | 4 | 0.10 |
| 2 | 100 | 0.30 | 20 | 10 | 140 | 46 | *BEA Zeolite | 13.8 | 98 | 530 | 0.21 | 4 | 0.09 |
| 3 | 60 | 0.35 | 20 | 10 | 140 | 48 | *BEA Zeolite | 14.2 | 95 | 410 | 0.16 | 4 | 0.03 |
| 4 | 50 | 0.30 | 20 | 10 | 140 | 60 | *BEA Zeolite | 13.6 | 101 | 332 | 0.13 | 4 | 0.06 |
| 5 | 250 | 0.35 | 20 | 10 | 140 | 20 | *BEA Zeolite | 21.4 | 48.4 | 543 | 0.21 | 4 | 0.04 |
| 6 | 200 | 0.35 | 20 | 10 | 140 | 36 | *BEA Zeolite | 21.2 | 53.2 | 581 | 0.23 | 4 | 0.04 |
| 7 | 150 | 0.36 | 20 | 10 | 140 | 48 | *BEA Zeolite | 16.4 | 122 | 536 | 0.21 | 4 | 0.04 |
| 8 | 150 | 0.30 | 20 | 10 | 140 | 48 | *BEA Zeolite | 15.7 | 117 | 564 | 0.22 | 4 | 0.04 |
| 9 | 30 | 0.38 | 20 | 10 | 140 | 74 | *BEA Zeolite | 10.9 | 324 | 622 | 0.24 | 4 | 0.01 |
| 10 | 30 | 0.23 | 20 | 10 | 140 | 74 | *BEA Zeolite | 11.0 | 241 | 625 | 0.24 | 4 | 0.01 |

TABLE 2

| Example | Composition of reaction mixture SiO₂/Al₂O₃ | Na₂O/SiO₂ | H₂O/SiO₂ | Seed crystal Amount of addition (wt %) | Heating conditions Temperature (°C.) | Time (h) | Zeolite | Product SiO₂/Al₂O₃ | SiO₂/ZnO | Micropore surface area (m²/g) | Micropore volume (cm³/g) | Mesopore diameter (nm) | Mesopore volume (cm³/g) |
|---|---|---|---|---|---|---|---|---|---|---|---|---|---|
| 1 | 100 | 0.50 | 20 | 10 | 140 | 27 | *BEA Zeolite | 13.2 | >1000 | 411 | 0.22 | Absence | 0 |
| 2 | 70 | 0.33 | 20 | 10 | 140 | 24 | *BEA Zeolite | 11.8 | >1000 | 389 | 0.20 | Absence | 0 |
| 3 | 40 | 0.28 | 20 | 10 | 140 | 46 | *BEA Zeolite | 11.0 | >1000 | 394 | 0.21 | Absence | 0 |
| 4 | 100 | 0.30 | 20 | 10 | 140 | 46 | Amorphous | | | | | | |

As is obvious from the comparison of Tables 1 and 2, it is found that the unfired zinc silicate beta zeolite is used as the seed crystal, and thereby the beta zeolite having both the micropore and the mesopore is obtained. In contrast, when the aluminosilicate beta zeolite is used as the seed crystal (Comparative Examples 1 to 3), no mesopore is formed in the obtained beta zeolite. Further, even when the zinc silicate beta zeolite is used as the seed crystal, if the zinc silicate beta zeolite is a fired product (Comparative Example 4), the crystallization of the zeolite does not occur.

The invention claimed is:

1. A beta zeolite in which:
   (i) a $SiO_2/Al_2O_3$ ratio ranges from 8 to 30, and a $SiO_2/ZnO$ ratio ranges from 8 to 1000;
   (ii) a micropore surface area ranges from 300 to 800 m²/g;
   (iii) a micropore volume ranges from 0.1 to 0.3 cm³/g; and
   (iv) in an as-synthesized state, a diameter of a mesopore ranges from 2 to 6 nm, and a volume of the mesopore ranges from 0.001 to 0.3 cm³/g.

2. A method for producing a beta zeolite comprising:
   (1) mixing a silica source, an alumina source, an alkali source, and water so as to be a reaction mixture having a composition represented by a molar ratio given below;

$SiO_2/Al_2O_3$=8 to 300

$Na_2O/SiO_2$=0.05 to 0.6

$H_2O/SiO_2$=5 to 50

(2) using the beta zeolite, which has a $SiO_2/ZnO$ ratio ranging from 4 to 50, a $SiO_2/Al_2O_3$ ratio that is equal to or more than 4, and a mean particle size that is equal to or more than 100 nm, as a seed crystal without being fired, and adding the beta zeolite to the reaction mixture at a rate of 0.1 to 20% by weight with respect to a silica component in the reaction mixture; and
   (3) airtightly heating the reaction mixture to which the seed crystal is added at 80 to 200° C.

3. The method according to claim 2, further comprising aging the reaction mixture under a temperature of 20 to 100° C. prior to heating the reaction mixture.

4. The method according to claim 3, wherein the reaction mixture is agitated in the airtightly heating process.

5. The method according to claim 2, wherein the reaction mixture is agitated in the airtightly heating process.

* * * * *